INVENTOR.
HERMAN GANG

BY

George V. Hall
ATTORNEY

June 8, 1965 H. GANG 3,188,003

OVERCAPACITY CONTROL IN A DECIMAL SYSTEM

Filed Sept. 7, 1962

3 Sheets-Sheet 2

INVENTOR.
HERMAN GANG

BY

George V. Hall
ATTORNEY

June 8, 1965 H. GANG 3,188,003

OVERCAPACITY CONTROL IN A DECIMAL SYSTEM

Filed Sept. 7, 1962 3 Sheets-Sheet 3

INVENTOR.
HERMAN GANG

BY

ATTORNEY

United States Patent Office 3,188,003

Patented June 8, 1965

3,188,003
OVERCAPACITY CONTROL IN A DECIMAL SYSTEM

Herman Gang, Morris Plains, N.J., assignor to Monroe International Corporation, a corporation of Delaware Filed Sept. 7, 1962, Ser. No. 222,140
13 Claims. (Cl. 235—60)

The present invention relates to decimal systems for calculating machines wherein values including whole number digits and decimal digits are entered into an ordinal series of differentially settable digital value selection means. The invention is disclosed as embodied in a machine including such a decimal system as fully disclosed in applicant's copending application filed on even date herewith and entitled Decimal Point Mechanism, Serial No. 222,144 to which reference is made for detailed disclosure of operations referred to herein but not described in detail.

In accordance with the disclosure of the above noted copending application, the decimal system is selectively settable for registration of one or a series of values in ordinally correct position with respect to a selected decimal point position thereby providing for a given number of decimal digits. A value is entered into a selector carriage upon depression of 0–9 digit keys of a ten key keyboard. The keys corresponding to the digits of the value are depressed in sequence from higher to lower orders. Furthermore a decimal key is depressed in proper decimal sequence with the digit keys.

The digits are entered into the orders of the selector carriage from higher to lower orders; the carriage being shifted one ordinal position toward the left upon each key depression with respect to an ordinal series of differential actuators of the registering mechanism. Accordingly when the actuators are operated under control of the selector carriage, the digits entered in the carriage are registered in the lower orders of the registering mechanism.

If a value entered into the selector carriage includes fewer decimal digits than provided for by the setting of the decimal system, the carriage is left shifted under control of shift limiting means before operation of the actuators thereby adding the number of zeros necessary to ordinally align the value with the decimal point position of the registering mechanism. It is however possible to enter a value into the selector carriage including a greater number of decimal digits than provided for by the setting of the decimal system. In such instance, the value would not be registered in ordinally correct position with respect to the selected decimal point position.

It is therefore a principal object of the invention to prevent operation of the registering mechanism of a calculating machine under control of digital value selection means after entry into the selection means of a number of decimal digits in excess to the number provided for by a decimal system of the machine.

It will be noted that if the decimal system is set for a given number of decimal digits, the number of whole number digits which may be entered into the selector carriage is limited to the difference between the capacity of the carriage and the number of decimal digits, or to the difference between the capacity of the registering mechanism and the number of decimal digits.

It is accordingly another object of the invention to prevent operation of the registering mechanism after entry into the selection means of a number of whole number digits in excess to a number determined by the number of decimal digits provided for by the decimal system.

In the following description with reference to the accompanying drawings, parts corresponding to parts of the reference application S.N. 222,144 will be identified by like reference numerals.

*The selector carriage*

Figure 1:
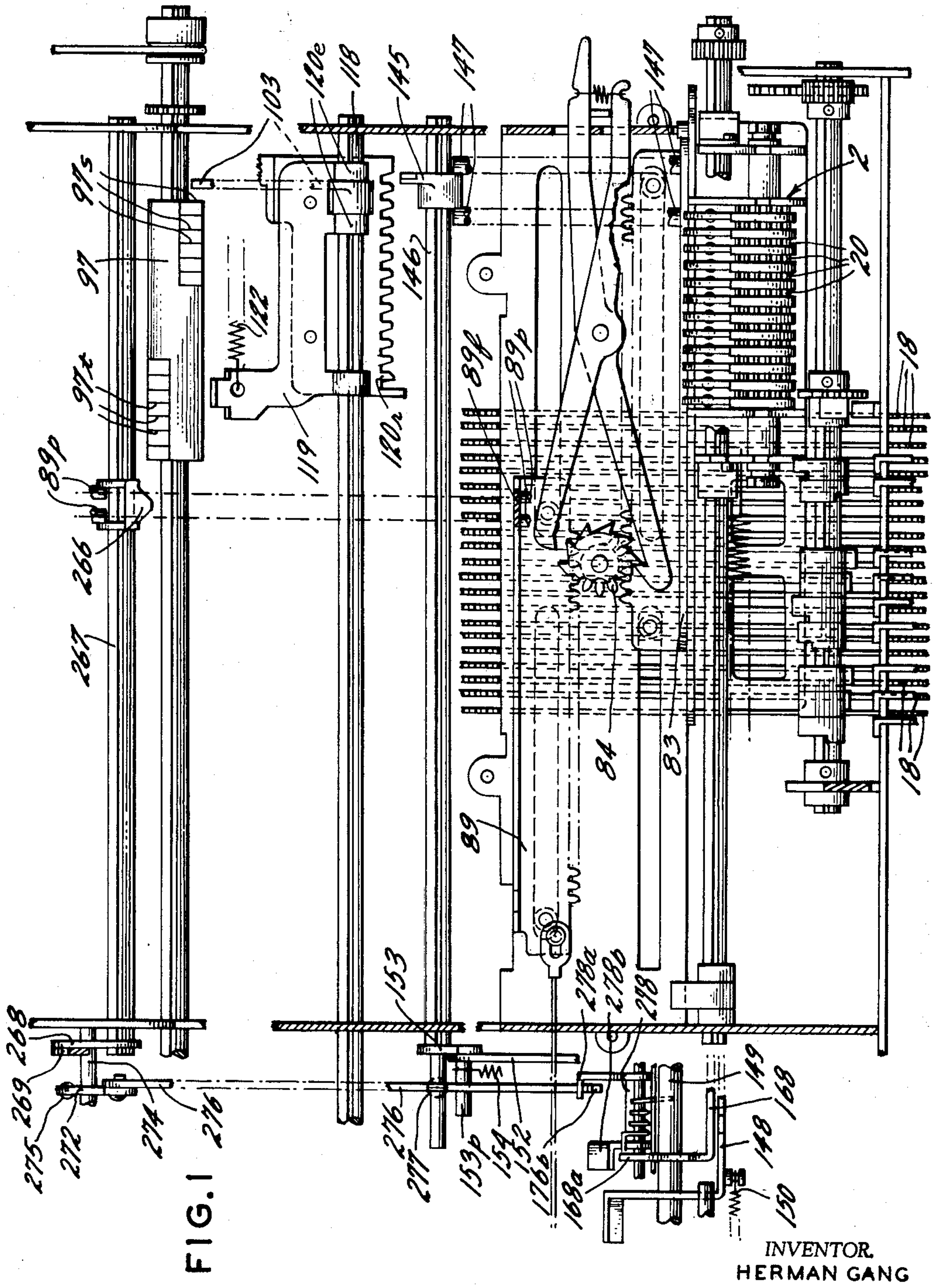
FIG. 1 is a mechanical schematic of parts of the machine in association with the devices of the invention, and with parts which are located in different planes shown in one horizontal plane for clarity.
Figure 3:
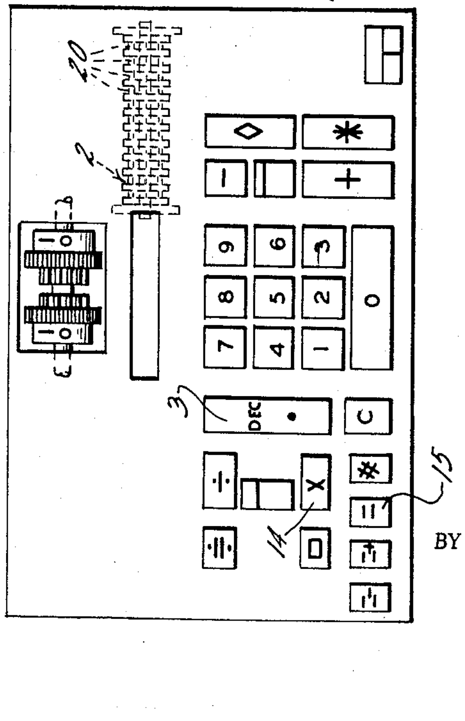
FIG. 3 is a plan view of the keyboard.

Selector carriage 2 (FIG. 1) includes an ordinal series of twelve storage selector gears 20. Selector carriage 2 is normally positioned, in the usual manner, with the highest order selector gear one ordinal position to the right of the lowest order of a series of actuator racks 18. Upon successive depression of 0–9 digit keys of the ten key keyboard (FIG. 3), the values of the depressed keys respectively are entered into the selector gears from higher to lower orders, and the carriage is step shifted toward the left to bring the set selector gears 20 successively from higher to lower orders into controlling position with respect to racks 18 from lower to higher orders.

The above operations are conventional in ten key machines, and it is understood that the selector carriage could be of the type having the well-known ordinal pin rows or other settable storage means to control operation of ordinally arranged digital actuating means. Furthermore shift means for the selector carriage and its control to effect left shift of the carriage is well known and may be of other design than disclosed in the aforesaid reference application.

*Carriage shift limiting means*

Selectively settable stop means is operable to terminate left shift of carriage 2 in ordinal position with respect to actuator racks 18 for entry into the machine of a value in ordinal position to provide for a given number of decimal digits.

Figure 2:
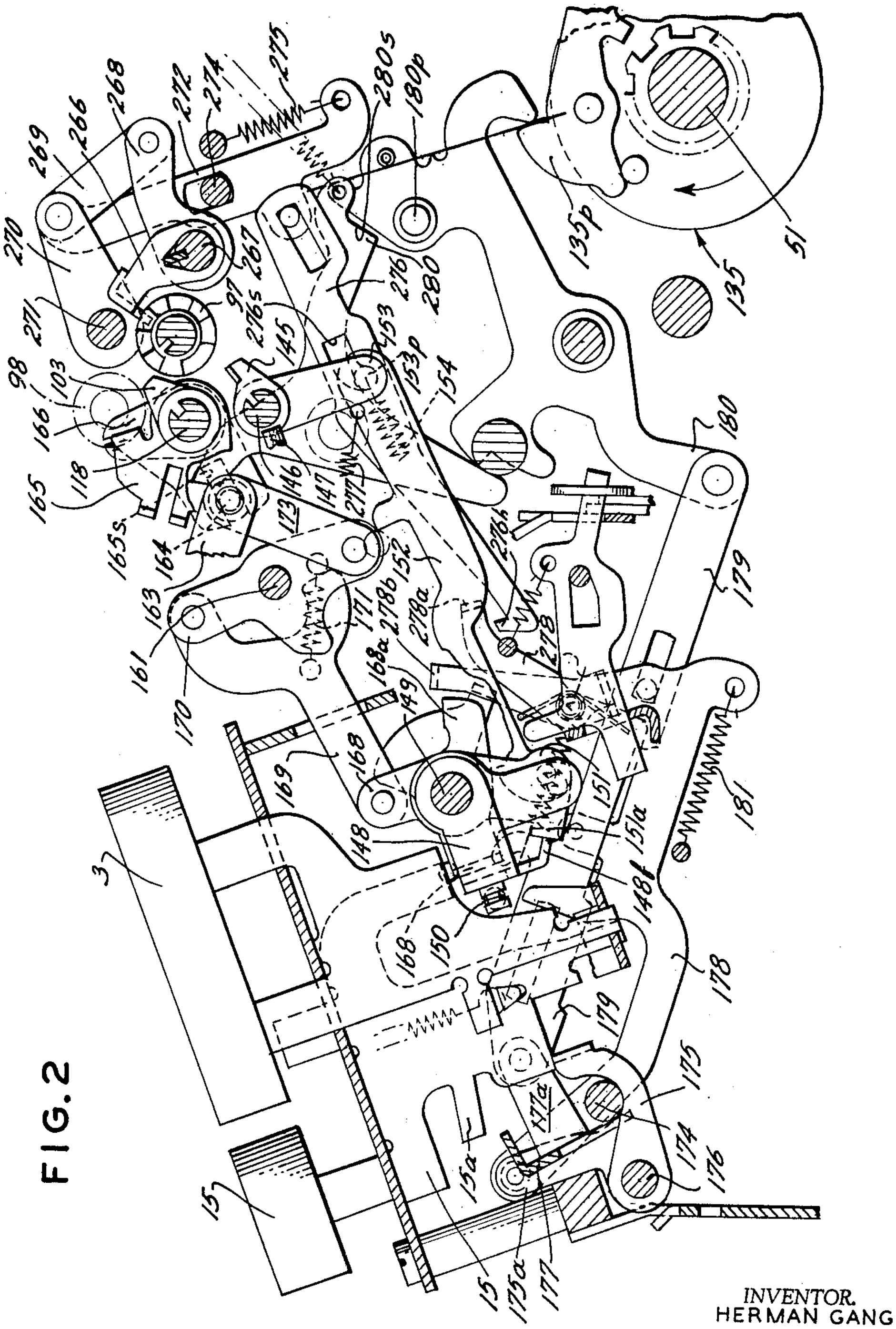
FIG. 2 is a detailed side elevation of the clutch control devices of the invention.

The stop means includes a selectively settable stepped drum 97 (FIGS. 1, 2) and a selectively settable stepped drum 98 shown in dot-dash lines (FIG. 2). Drum 97 is adapted for engagement by a stop arm 103 to terminate a left shift of carriage 2 in position for entry of one factor of a problem in ordinal position to provide a preselected number of decimal digits. Drum 98 is adapted for engagement by arm 103 to terminate a left shift of the carriage in position for entry of the other factor in ordinal position to provide a preselected number of decimal digits.

As will be described later, stop arm 103 is normally in a right home position and is adapted to be coupled for left shift movement with carriage 2 upon depression of decimal key 3 or upon depression of any one of a number of function control keys including factor entering key 15 if the decimal key has not been depressed. Furthermore arm 103 is normally in an ineffective central position (FIG. 2) with respect to drums 97, 98 and is adapted to be rocked clockwise upon depression of key 15 for movement with carriage 2 in a path to engage the end or a step of drum 97, and is adapted to be rocked counterclockwise upon depression of another factor entering key 14 (FIG. 3) for movement with the carriage in a path to engage the end or a step of drum 98.

The devices of the invention are operable in conjunction with drum 97 and substantially corresponding devices are operable in conjunction with drum 98. Therefore only the devices operable in conjunction with drum 97 are shown and described.

Drum 97 is selectively settable to terminate left shift of carriage 2 in position for entry of a value including from 0–7 decimal digits. Stop arm 103 is normally one ordinal carriage shift position (FIG. 1) to the right of drum 97. The right end of drum 97 is thereby adapted for engagement by arm 103 when coupled with carriage 2 to terminate the left carriage shift after one ordinal step of movement to provide for one decimal digit. Drum 97 therefore has six spirally arranged steps 97*s* which, upon rotation of the drum, are brought successively into position for engagement by arm 103 to arrest left shift movement of carriage 2 after two, three, etc., respective ordinal steps of left shift movement. When drum 97 is set for 0 decimal digits, the decimal system is disabled and left shift of carriage 2 is not terminated under control of the drum.

Steps 97*s* are in a clockwise spiral (FIG. 2) from the right end of the drum at an angular spacing of 40° and spaced longitudinally of the drum a distance equal to one ordinal shift of carriage 2. Drum 97 is therefore manually set counterclockwise to brings steps 97*s* successively in position for engagement by arm 103. When the drum is in the 1 decimal digit position, its right end is in the path of arm 103 when said arm is adjusted clockwise. When the drum is in the 2–7 positions the corresponding steps 97*s* are in the path of arm 103 when it is adjusted clockwise. Appropriate detent means (not shown) is operable to locate drum 97 in adjusted position.

Arm 103 has a hub splined on a shaft 118 which extends transversely of the machine and is fulcrumed for rocking movement in the machine side frames. Arm 103 therefore will be rocked with shaft 118 and is shiftable longitudinally thereon.

Arm 103 is shiftable on shaft 118 with a stop carriage 119. Carriage 119 is shiftably mounted on shaft 118 and on transverse rail means (not shown). The hub of arm 103 is trapped between a pair of ears 120*e* adjacent the right end of carriage 119. Therefore carriage 119 with arm 103 is shiftable on shaft 118 and the arm is rocked with the shaft in any shifted position. Normally the carriage is held in right home position by a spring 122. Means is operable upon depression of decimal key 3 to couple stop carriage 119 for left shift movement with selector carriage 2, or is operable upon depression of function key 15 if the decimal key has not been depressed.

The coupling means includes a finger 145 adapted to engage a rack 120*r* of stop carriage 119. Finger 145 includes a hub portion which is splined on a transverse shaft 146 which is rotatably mounted in the machine side frames. Finger 145 therefore is adapted to be rocked with shaft 146 and is longitudinally shiftable thereon. A pair of pins 147 project from the rear of carriage 2 and the hub of finger 145 is trapped between these pins. Therefore finger 145 is shifted with carriage 2, and if the finger is engaged with rack 120*r*, stop carriage 119 will be coupled and shifted therewith.

Finger 145 is normally in clockwise position beneath rack 120*r*. There is a tooth space of rack 120*r* for each digit position of selector carriage 2 and a tooth space for home position. The digit capacity of carriage 2 is twelve, and therefore rack 120*r* has thirteen tooth spaces which may be engaged by coupling finger 145.

When carriages 2 and 119 are in right home position, finger 145 is aligned beneath the rightmost tooth space of rack 120*r*. As carriage 2 is step shifted toward the left, finger 145 is shifted into alignment with the successive tooth spaces. Upon depression of decimal key 3, finger 145 is rocked counterclockwise to engage a tooth space thereby coupling stop carriage 119 for left shift with selector carriage 2 as follows.

Figure 4:
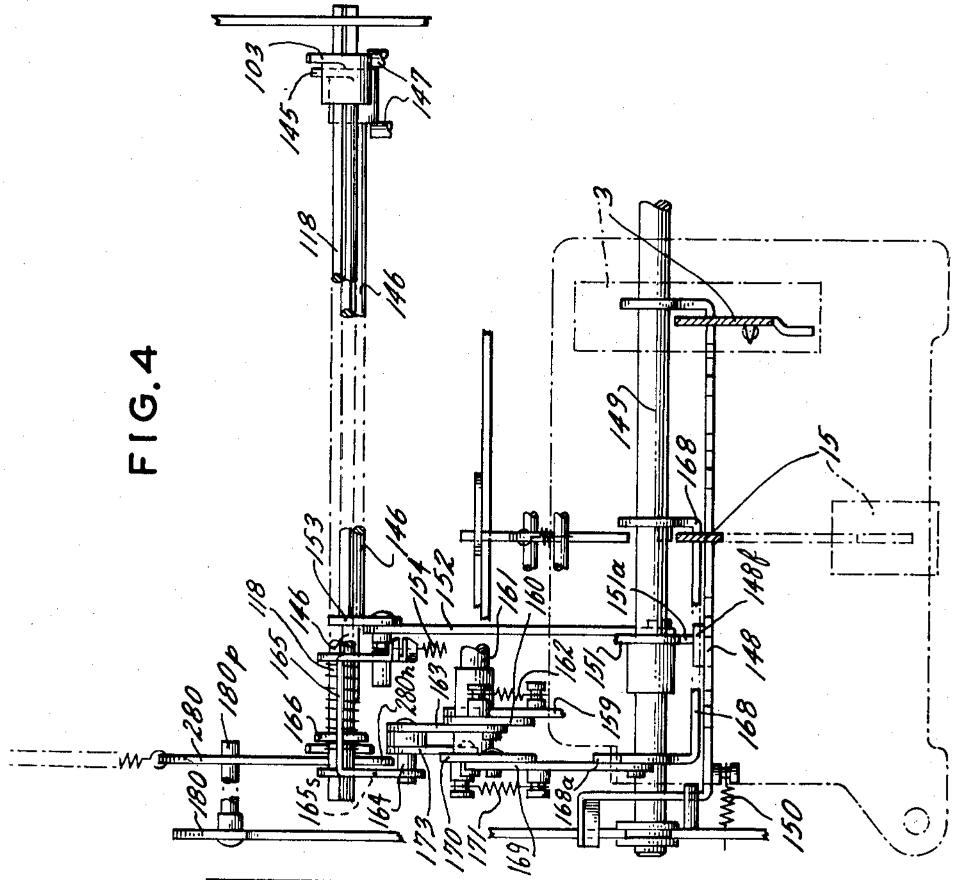
FIG. 4 is a fragmentary plan view of the devices shown in FIG. 2.

Decimal key 3 (FIGS. 2, 4) is freely retractable and a rear shoulder of its key stem overlies a bail 148 which is loosely mounted for rocking movement on a transverse shaft 149. Bail 148 is normally held clockwise by a spring 150.

A finger 148*f* projects downwardly to the rear from bail 148 and engages a forwardly projecting lug 151*a* at the lower end of a depending arm 151 loosely mounted at its upper end on shaft 149. A rearwardly extending link 152 is pivotally connected at its front to the lower end of arm 151, and at its rear, the link is pivotally mounted to the lower end of a depending arm 153 which is fast at its upper end on shaft 146 on which finger 145 is mounted. A spring 154 holds link 152 forwardly with arm 151 clockwise to engage lug 151*a* with finger 148*f*, and finger 145 clockwise from engagement with rack 120*r*.

Depression of decimal key 3 will rock bail 148 counterclockwise, and finger 148*f* will likewise rock arm 151 thereby moving link 152 toward the rear to rock arm 153, shaft 146 and finger 145 counterclockwise to engage rack 120*r* thereby coupling selector carriage 2 and stop carriage 119. A latch (not shown) is operable to hold bail 148 rocked upon release of decimal key 3 to maintain the coupling of carriages 2, 119.

After depression of decimal key 3, the decimal digits will be entered into carriage 2. Then machine function key 15 will be depressed to perform operations later described. At this time it will be appropriate to describe coupling of carriages 2, 119 upon depression of key 15 if decimal key 3 has not been depressed.

If a value entered into carriage 2 does not include a decimal digit, decimal key 3 will not be depressed. It is therefore necessary that depression of key 15 effects the coupling of carriages 2, 119 so that carriage 2 may be controlled in subsequent left shift movement to add zeros to the right of the whole number value to thereby ordinally relate the value to the fixed decimal point position which provides for a given number of decimal digits.

The operation of key 15 to effect the coupling operation is substantially identical to the operation described above for decimal key 3. A rear shoulder of the stem of key 15 overlies bail 148 which will therefore be rocked upon depression of key 15 to effect the coupling operation.

Depression of key 15 is operable to rock stop arm 103 clockwise for left shift movement with carriage 2 in a path to engage stop drum 97 to ordinally locate the carriage for the value entering operation, and to engage main clutch 135.

The means for rocking arm 103 upon depression of key 15 includes a bail 168 (FIGS. 2, 4) loosely mounted on shaft 149 on which bail 148 is mounted. Bail 168 extends longitudinally of shaft 149 inwardly of bail 148 and on the same side of shaft 149, and lies beneath the rear shoulder of the stem of key 15. Accordingly, when key 15 is depressed, bail 168 will be rocked counterclockwise.

Bail 168, at its left end, is provided with an upstanding ear to which the front end of a rearwardly extending link 169 is pivotally connected. The rear end of link 169 is pivotally connected to the upper end of a vertically disposed lever 170 which is fulcrumed on a stub shaft 161. A spring 171 is connected between a pin intermediate the ends of link 169 and a pin intermediate the lower arm of lever 170. Spring 171 therefore holds lever 170 clockwise and holds link 169 counterclockwise with respect to its connection with the lever normally to engage the end of a lower offset of the link with the pin of the lever.

A link 173 has pivotal connection at one end with the lower end of lever 170, and extends toward the rear where its other end is pivotally mounted on a pin 164 which engages a slot 165*s* of a crank 165 connected to an arm 166 splined on shaft 118.

Pin 164 is carried at the rear of a link 163 corresponding substantially to link 173. The front of link 163 is pivotally connected to the top of an upstanding lever 160 (FIG. 4) fulcrumed on shaft 161 with and corresponding to lever 170. The lower end of lever 160 is pivotally connected to the rear of a link 159 corresponding to link 169 and the link and lever are biased by a connecting spring 162 corresponding to spring 171. The above parts 159, 160, 162, 163 are included in a train for rocking stop arm 103 counterclockwise for operation with stop drum 98. These parts operate substantially in accordance with the corresponding parts in the train for adjusting arm 103 clockwise but in reverse directions. The parts in the two trains, held in normal position by springs 162 and 171, will hold arm 103 in central position. The operation of the train to adjust arm 103 clockwise follows.

When bail 168 is rocked counterclockwise upon depression of key 15, link 169 will be moved forwardly thereby rocking lever 170 counterclockwise against the tension of spring 171 and moving link 173 toward the rear. Rearward movement of link 173 will rock crank 165 clockwise thereby rocking stop arm 103 clockwise for movement in a path to engage stop drum 97 upon left shift of stop carriage 119 with selector carriage 2. In this operation, link 163 will be rocked counterclockwise about its front connection with link 160 which will be held stationary by spring 162.

*Engagement of the main clutch*

Depression of key 15 is operable to engage main clutch 135 (FIG. 2). The key is spring retracted and therefore means is operable to latch the key depressed to maintain stop arm 103 clockwise.

A bail 175 extends transversely of the machine and is engaged at its upper edge by a forwardly extending shoulder of the stem of key 15. Bail 175 is supported at the rear of a pair of horizontally disposed arms which at their front are rockably mounted on a shaft 176 supported in the machine side frames.

A lug 15*a* extends forwardly from the stem of key 15, and the rear edge of a transverse bail 177 is normally located below and forwardly of lug 15*a*. Bail 177 is secured on a transverse shaft 174 which is fulcrumed in the machine side frames.

The left arm of bail 175 includes an upstanding arm 175*a* whereas a rearwardly extending arm 177*a* is carried by the left end of bail 177. A rearwardly extending link 178 is pivotally connected at its front to the end of arm 175*a* of bail 175 and a rearwardly extending link 179 is pivotally connected at its front to arm 177*a* of bail 177. Links 178, 179 have yieldable slot and pin connection; link 179 being normally spring held rearwardly with respect to link 178 to the limit of the slot and pin connection and connected at its rear to the front end of a clutch lever 180 of clutch 135.

Clutch 135 is of well-known construction wherein the driving member driven by a motor (not shown) is adapted to be engaged by a spring urged pawl 135*p* mounted on the driven member which is secured to the machine main drive shaft 51.

A spring 181 attached to link 178 normally holds links 178, 179 forwardly thereby holding bails 175, 177 counterclockwise and clutch lever 180 clockwise in engagement with pawl 135*p* to disengage clutch 135. Depression of key 15 will rock bail 175 clockwise thereby moving links 178, 179 rearwardly and rocking clutch lever 180 counterclockwise to release pawl 135*p* to engage clutch 135.

In the above clutch engaging operation, bail 177 will be rocked clockwise by link 179 as key 15 moves downwardly. This will engage the rear edge of bail 177 with the front of lug 15*a* of the key stem. Thereupon the spring connection between links 178, 179 will yield until lug 15*a* passes below bail 177 which will then snap clockwise above lug 15*a* to latch key 15 depressed and the clutch engaging parts in operated position.

Clutch 135 will be interrupted in its cycle after a 30° step of operation. In this step of operation, means is operable to release carriage 2 from the shift escapement for left shift movement with coupled stop carriage 119. The carriages will be shifted until arrested by engagement of stop arm 103 with the end of drum 97 or a step 97*s* of the drum, depending on the setting, to ordinarily locate carriage 2 with respect to the decimal point position. Then the clutch will be reengaged to effect the value entering operation. The present invention is not concerned with these operations fully disclosed in the aforenoted application, but with means to prevent engagement of the clutch when either an excess of whole number digits or decimal digits are entered into selector carriage 2.

*Whole number digit overcapacity control*

Selector carriage 2 has a twelve digit capacity. However upon operation of clutch 135 in response to depression of key 15, the value in the carriage is entered into storage means (not shown) having a ten digit capacity. Therefore, means is provided to lock key 15 against depression if the number of whole number digits of the value entered into carriage 2 totaled with the number of decimal digits provided for by the setting of drum 97 exceeds ten. But for this provision, an incorrect value could be entered in the ten digit capacity storage. The means for locking key 15 comprises means for locking bail 168 (FIGS. 2, 4) from counterclockwise movement which movement, as previously described, is effected by depression of the key. The locking means is constructed and operates as follows.

Stop drum 97 including steps 97*s* (FIGS. 1, 2) has been described as settable for operation in conjunction with stop arm 103 to terminate left shift of selector carriage 2 in position for entry of a value including from 0–7 decimal digits in the ten digit capacity storage means.

Drum 97 has a spiral of seven steps 7*t*, similar to steps 97*s*, extending inwardly from the left end of the drum. Steps 97*t* extend inwardly from the left end of the drum in opposite direction from steps 97*s* extending inwardly from the right end, i.e., counterclockwise when viewed from the right. Steps 97*t*, like steps 97*s*, each extend through an angle of 40° and extend longitudinally of the drum a distance equal to one ordinal shift of selector carriage 2. Steps 97*t* and the left periphery of the drum are operable in conjunction with the locking means for key 15 as follows.

A rack 89 engages a gear 84 in opposition to a rack 83 which engages the gear and which is secured to the rear of carriage 2. Therefore rack 89 is shifted in opposite direction from carriage 2.

A sensing arm 266 normally located to the left of drum 97 includes an upper cam end and has a hub splined for shifting movement on a transverse shaft 267 which is rotatably mounted in the machine framing. An upstanding finger 89*f* at the right rear of rack 89 carries a pair of pins 89*p* which engage the hub of arm 266; and therefore the arm is shifted with the rack.

A rearwardly extending arm 268 is fast at its front on shaft 267 adjacent its left end. The lower end of a link 269 is pivotally connected to the rear of arm 268 and has its upper end pivotally connected to the rear of an arm 270 which at its front is loosely mounted on a transverse shaft 271 supported in the machine framing.

A vertically disposed link 272 has common pivotal connection at its top with link 269 and arm 270, and is supported intermediate its ends by a fixed shaft 274 which engages a longitudinal slot in said link 272. A spring 275 normally holds link 272 raised to the limit imposed by shaft 274. Therefore arm 268, shaft 267 and sensing arm 266 will be held counterlockwise. Thus the cam end of arm 266 will normally be held in a path wherein, upon right shift movement, it will engage the periphery of drum 97.

A horizontally disposed lever 276 has slot and pin connection at its rear with link 272 adjacent its lower end. Lever 276 is fulcrumed intermediate its ends on a pin 153*p* at the end of depending arm 153 which, as previously described, is fast at its upper end on shaft 146. Arm 153 and shaft 146, as previously described, are rocked counterclockwise, upon depression of decimal key 3 or function key 15, to couple selector carriage 2 and stop carriage 119.

Pin 153*p* fulcrums lever 276 by engagement with a longitudinal slot 276*s* in said lever. The front end of slot 276s curves downwardly and is rounded to the contour of pin 153p which normally engages this front end of the slot; such engagement being maintained by a spring 277 which normally holds lever 276 clockwise about its slot and pin connection at the rear with link 272.

The front of lever 276 is in the form of an upwardly turned hook 276h which is normally below and forward of a lug 278a at the end of a rearwardly extending arm of a crank 278 fulcrumed on a fixed shaft in the machine framing. Normally crank 278 is held clockwise by a torsion spring, and includes an upstanding arm having a lug 278b at its end positioned to the rear and immediately above a rearwardly extending ear 168a of bail 168. Therefore, if crank 278 is rocked counterclockwise, lug 278b will be moved above ear 168a thereby locking bail 168 against counterclockwise movement and key 15 against depression.

Sensing arm 266 will be shifted one ordinal position to the right upon entry of each digit into selector carriage 2. If the number of whole number digits does not exceed the capacity, as previously explained, the cam end of sensing arm 266 will not engage drum 97 and said arm will remain counterclockwise. Then upon depression of decimal key 3 or key 15, the consequent counterclockwise movement of arm 153 will move lever 276 toward the rear thereby locating hook end 276h to the rear of lug 278a of crank 278. This rear movement is permitted by the slot and pin connection at its rear with link 272.

After the above operation upon depression of decimal key 3, the entry of decimal digits will further step shift sensing arm 266 toward the right. This may bring the cam end of the arm into engagement and past the left peripheral edge of drum 97, or into engagement and past the bottom edge of a step 97t, depending on the setting of the drum. In this event, arm 266 will be rocked clockwise and through the connections, lever 276 will be rocked clockwise about its slot and pin fulcrum at the end of arm 153 to raise hook end 276h idly to the rear of lug 278a of crank 278; and therefore bail 168 and key 15 will not be locked.

When the number of whole number digits exceeds the capacity, drum 97 will cause lever 276 to be rocked clockwise as described above. This however will occur before lever 276 is moved rearwardly, as described, upon depression of decimal key 3. Therefore, clockwise movement of lever 276 will engage its front end with lug 278a thereby rocking crank 278 counterclockwise to lock bail 168 and key 15. In this operation, spring 277 will maintain the engagement of the front end of slot 276s with pin 153p and the hook end 276h will be located forwardly of lug 278a of crank 278. Accordingly when arm 153 is rocked counterclockwise upon depression of decimal key 3, hook 276h will engage lug 278a thereby restraining lever 276 from rearward movement from engagement with the lug; and therefore key 15 will remain latched. In the counterclockwise movement of arm 153, pin 153p will be removed from the front depressed end of slot 276s and move therein toward the rear. Spring 277 will yield to permit this operation and lever 276 will be rocked slightly counterclockwise about its rear connection and crank 278 clockwise. This movement however is not sufficient to disturb the locking operation.

The cam end of sensing arm 266 is three ordinal carriage shift positions from the left end of drum 97 when carriage 2 is in right home position. When drum 97 is set for 0 decimal digits, the bottom of the seventh (last step) 97t is in the path of the cam end of arm 266. The cam end of arm 266 will be shifted to a position immediately to the left of the bottom of the seventh step 97t upon entry of ten whole number digits. Now if an eleventh whole number digit is entered, the cam end will engage and pass beyond the bottom of the step, and arm 266 will be rocked to effect the locking operation. As drum 97 is adjusted from 0 to its successive decimal digit positions, the bottoms of the sixth, fifth, etc., steps 97t will be brought into the path of arm 266. When the drum is adjusted for seven decimal digits, the peripheral left end of the drum will be in the path of arm 266, and will engage and operate the arm to effect the locking operation upon entry of the fourth whole number digit.

*Decimal digit overcapacity control*

Drum 97 is settable to control selector carriage 2 for entry of a maximum of seven decimal digits. Stop arm 103 for carriage 2 is normally in a central position with respect to stop drums 97, 98, and upon depression of key 15, it is rocked clockwise for shifting in a path to engage a step 97s of drum 97 to arrest left shift of the carriage. Because of the central position of arm 103, a number of decimal digits in excess to that provided for by the setting of drum 97 may be entered into carriage 2. This excess entry will shift arm 103 to the left past the step 97s which it should engage to limit left shift of the carriage. In this event, arm 103 will be blocked from clockwise movement by engagement with the peripheral face of drum 97. Key 15 however can be depressed because of the yield afforded by spring 171 in the train between key 15 and arm 103, and by the yield of spring 162 between arm 159 and lever 160. Means therefore is provided to prevent engagement of main clutch 135 upon depression of key 15 if arm 103 is blocked from clockwise movement; otherwise a value would be entered in ordinally incorrect position with respect to the selected decimal point position.

The means for preventing engagement of clutch 135 includes a crank 280 (FIG. 2) pivotally mounted inwardly of the machine left side frame (not shown). Normally crank 280 is spring held counterclockwise against a limit stop. When crank 280 is in normal position, a shoulder 280s thereof is above the path of movement of a pin 180p of clutch lever 180 when said lever is rocked counterclockwise to engage clutch 135. Therefore normally, crank 280 will not interfere with engagement of the clutch.

A nose 280n of crank 280 is located immediately to the rear of pin 164 at the rear of links 163, 173 and which engages slot 165s of crank 165. Crank 165, as described, rocks shaft 118, and stop arm 103 splined thereon.

In normal operation upon depression of key 15, crank 165 will be rocked clockwise to likewise rock arm 103. In this operation, pin 164 in slot 165s will be raised idly above nose 280n without dislocating crank 280. However, if arm 103 is blocked from clockwise movement, spring 162 between link 159 and lever 160 will yield as well as spring 171 between link 169 and lever 170. As a result pin 164 will be moved rearwardly in slot 165s to engage nose 280n thereby rocking crank 280 clockwise to lower shoulder 280s into the path of pin 180p of clutch lever 180. The clutch lever therefore is blocked from movement to engage clutch 135. In this operation, the spring connection between links 178, 179 will yield as link 178 is moved rearwardly upon depression of key 15.

Obviously the overcapacity storage means would be designed in consideration of the capacity of the selector carriage when the register or storage into which the value is entered has a greater capacity than the carriage, and with any desired ratio between whole number and decimal digits.

I claim:

1. In a calculating machine having registering mechanism including an ordinal series of differential actuators; an ordinal series of differentially settable digital value selection means for controlling operation of said actuators; drive means for said actuators; and means for initiating operation of said drive means: means for entering a value including whole number digits and decimal digits into said selection means; means operable only in the entry of whole number digits to disable said drive initiating means upon entry into said selection means of more than a given number of whole number digits; and means operable only in the entry of decimal digits to disable said drive initiating means upon entry into said selection means of more than a given number of decimal digits.

2. In a calculating machine having registering mechanism including an ordinal series of differential actuators; an ordinal series of differentially settable digital value selection means for controlling operation of said actuators; drive means for said actuators; and means for initiating operation of said drive means: means for entering a value including whole number digits and decimal digits into said selection means; decimal means selectively settable to a plurality of positions for ordinally controlling said selection means with respect to said actuators for registration of values respectively having different numbers of decimal digits; and means for disabling said drive initiating means upon entry into said selection means of a number of decimal digits exceeding the number provided for by the setting of said decimal means.

3. The invention according to claim 2 including: means for disabling said drive initiating means upon entry into said selection means of a number of whole number digits exceeding a fixed ratio with respect to the number of decimal digits provided for by the setting of said decimal means.

4. The invention according to claim 3 wherein: said decimal means and said disabling means include cooperatively related elements common to both of said means.

5. In a calculating machine having registering mechanism including an ordinal series of differential actuators; an ordinal series of differentially settable digital value selection means for controlling operation of said actuators; drive means for said actuators; and means for initiating operation of said drive means: means for entering a value including whole number digits and decimal digits into said selection means; and means operable only in the entry of whole number digits for disabling said drive initiating means upon entry into said selection means of more than a given number of whole number digits.

6. The invention according to claim 5 wherein: said means for entering a value into said selection means includes a decimal key; and said means for disabling said drive initiating means is normally enabled and is disabled upon depression of said decimal key when entry of whole number digits does not exceed said given number.

7. The invention according to claim 6 including: normally disabled means operable only in the entry of decimal digits and enabled upon depression of said decimal key for disabling said drive initiating means upon entry into said selection means of more than a given number of decimal digits.

8. In a calculating machine having registering mechanism including an ordinal series of differential actuators; a selector carriage including an ordinal series of differentially settable digital value selection means for controlling said actuators; means for shifting said carriage relative to said actuators; digital value keys successively depressible in accordance with the digits of a selected value; means operable in response to each key depression for entering a digit into said selection means and for controlling said shifting means for one ordinal shift of said carriage; drive means for said actuators; and means for initiating operation of said drive means including a key, a transmission train between said key to said drive means, and yieldable connections in said transmission train: a decimal key for depression in decimal sequence with said digit keys; a normally disable shift limiting means to limit shifting of said carriage a given number of ordinal positions subsequent to depression of said decimal key; and means controlled by said shift limiting means to prevent operative movement of said transmission train upon depression of said drive initiating key when said carriage is shifted more than said given number of ordinal positions subsequent to depression of said decimal key.

9. In a calculating machine having registering mechanism including an ordinal series of differential actuators; a selector carriage including an ordinal series of differentially settable digital value selection means for controlling said actuators; means for shifting said carriage relative to said actuators; digital value keys successively depressible in accordance with the digits of a selected value; means operable in response to each key depression for entering a digit into said selection means and for controlling said shifting means for one ordinal shift of said carriage; drive means for said actuators; and means for initiating operation of said drive means: means for entering a value including whole number digits and decimal digits into said selection means; and means operable only in the entry of whole number digits for disabling said drive initiating means upon entry into said selection means of more than a given number of whole number digits.

10. The invention according to claim 9: including a decimal key for depression in decimal sequence with said digit keys; a normally disabled shift limiting means to limit shifting of said carriage a given number of ordinal positions subsequent to depression of said decimal key; and means operable to disable said drive initiating means when said carriage is shifted more than said given number of ordinal positions subsequent to depression of said decimal key.

11. The invention according to claim 10: wherein said means for initiating operation of said drive means includes a key; and said means for disabling said drive initiating means upon entry of more than a given number of whole number digits includes means for locking said drive initiating key against depression.

12. The invention according to claim 11 wherein: said means operable to lock said drive initiating key includes an element of said shift limiting means.

13. The invention according to claim 12 wherein: said element of said shift limiting means is selectively settable to a plurality of positions to limit shifting of said carriage to a plurality of ordinal positions respectively subsequent to depression of said decimal key; said means to disable said drive initiating means is operable when said carriage is shifted more than the number of ordinal positions provided for by the setting of said shift limiting means; and said means operable to lock said drive initiating key is operable upon entry into said selection means of a number of whole number digits exceeding a fixed ratio with respect to the number of ordinal shifts of said carriage provided for by the setting of said element of said shift limiting means.

References Cited by the Examiner

UNITED STATES PATENTS

| | | | |
|---|---|---|---|
| 2,917,232 | 12/59 | Wagemann | 235—60.15 |
| 2,987,246 | 6/61 | Wagemann | 235—60.15 |
| 3,005,585 | 10/61 | Capellaro | 235—60 |
| 3,066,864 | 12/62 | Malavazos | 235—61 |
| 3,087,673 | 4/63 | Lapointe | 235—61 |

LEO SMILOW, *Primary Examiner.*